(12) United States Patent
Hoffjann et al.

(10) Patent No.: US 8,910,484 B2
(45) Date of Patent: Dec. 16, 2014

(54) SYSTEM AND PROCESS FOR THE REDUCTION OF HARMFUL SUBSTANCES IN ENGINE EXHAUST GASES

(75) Inventors: Claus Hoffjann, Hamburg (DE); Hansgeorg Schuldzig, Jork (DE); Ralf-Henning Stolte, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1172 days.

(21) Appl. No.: 12/865,296

(22) PCT Filed: Jan. 22, 2009

(86) PCT No.: PCT/EP2009/000383
§ 371 (c)(1), (2), (4) Date: Oct. 21, 2010

(87) PCT Pub. No.: WO2009/095180
PCT Pub. Date: Aug. 6, 2009

(65) Prior Publication Data
US 2011/0048026 A1  Mar. 3, 2011

Related U.S. Application Data

(60) Provisional application No. 61/025,015, filed on Jan. 31, 2008.

(30) Foreign Application Priority Data

Jan. 31, 2008 (DE) .......................... 10 2008 006 953

(51) Int. Cl.
| | |
|---|---|
| *F02C 7/08* | (2006.01) |
| *F02C 7/00* | (2006.01) |
| *F02C 6/18* | (2006.01) |
| *F02C 3/30* | (2006.01) |
| *F02C 7/224* | (2006.01) |
| *F02M 25/022* | (2006.01) |

(52) U.S. Cl.
CPC ................ *F02C 3/305* (2013.01); *F02C 7/224* (2013.01); *F02M 25/0228* (2013.01); *F05D 2270/082* (2013.01); *Y02T 10/121* (2013.01); *Y02T 50/677* (2013.01); *F05D 2220/762* (2013.01)
USPC .............................. 60/780; 60/39.5; 60/39.53

(58) Field of Classification Search
CPC .............. F02C 7/10; F02C 3/30; F02C 3/305; F02C 3/20; F02C 7/224; F22B 1/003
USPC ............... 60/39.511, 39.5, 39.53, 39.59, 780, 60/775, 772, 266, 267, 736
See application file for complete search history.

(56) References Cited

U.S. PATENT DOCUMENTS

| | | | | |
|---|---|---|---|---|
| 6,868,677 | B2 * | 3/2005 | Viteri et al. ..................... | 60/784 |
| 7,380,749 | B2 * | 6/2008 | Fucke et al. .................... | 244/58 |

(Continued)

FOREIGN PATENT DOCUMENTS

| | | |
|---|---|---|
| DE | 10216710 | 4/2003 |
| EP | 0593793 | 4/1994 |

OTHER PUBLICATIONS

International Search Report, European Patent Office, Forms PCT/ISA/210, PCT/ISA/237, Apr. 3, 2009.

*Primary Examiner* — Gerald L Sung
(74) *Attorney, Agent, or Firm* — Wood, Herron & Evans, LLP

(57) ABSTRACT

A system for reducing harmful substances in engine exhaust gases includes a fuel cell, which is adapted to generate electrical energy and a steam-containing fuel cell exhaust gas during operation. A fuel tank serves to store fuel which is to be supplied to an engine during operation. A condensing device is connected to an exhaust gas outlet of the fuel cell so that steam-containing fuel cell exhaust gas is supplyable to the condensing device. The condensing device is adapted to convert the steam contained in the fuel cell exhaust gas into the liquid state of aggregation by means of condensation and to introduce the water obtained as a result of the condensing process into the fuel in order to form a water/fuel mixture. A water/fuel mixture line is connected to the engine so that a water/fuel mixture is supplyable to the engine.

12 Claims, 2 Drawing Sheets

(56) References Cited

U.S. PATENT DOCUMENTS

| | | | |
|---|---|---|---|
| 7,818,969 B1 * | 10/2010 | Hotto | 60/780 |
| 2002/0144664 A1 | 10/2002 | Haldeman, III | |
| 2004/0040312 A1 | 3/2004 | Hoffjann et al. | |

* cited by examiner

SYSTEM AND PROCESS FOR THE REDUCTION OF HARMFUL SUBSTANCES IN ENGINE EXHAUST GASES This application claims priority to International Application No. PCT/EP2009/000383, filed Jan. 22, 2009, under Section 371 and/or as a continuation under Section 120; which in turn claims priority to both U.S. Ser. No. 61/025,015, filed Jan. 31, 2008, and Getman Application No. 10 2008 006 953.1, filed Jan. 31, 2008.

TECHNICAL FIELD

The present invention relates to a system and a process for reducing harmful substances in engine exhaust gases.

BACKGROUND

In engines which are currently used in aircraft, particularly aeroplanes, and function according to the operating principle of a gas turbine, outside air is compressed by means of a compressor and then supplied to a combustion chamber. In the combustion chamber, the outside air is mixed with fuel and ignited. The exhaust gas generated as a result of the combustion process is conducted over a turbine which drives a compressor, which is arranged with the turbine on a common shaft or is separated from the turbine by a gear, and also the actual propulsion unit, for example a turbofan or propeller. As the fuel, for example kerosene, which comprises a hydrocarbon mixture combusts with air in the combustion chamber of an aeroplane engine, in addition to nitrogen oxides ($NO_x$) further combustion products, such as $CO_2$, CO and non-burned hydrocarbons, are produced. In particular, the quantity of the nitrogen oxides formed during the combustion process depends greatly on the combustion temperature in the combustion chamber. High combustion temperatures promote the formation of nitrogen oxide. Moreover, high combustion temperatures in the combustion chamber result in a significant material load and high stresses in the engine. Particularly high combustion temperatures are achieved in the start phase of the aeroplane, during which the engine runs under full load to meet the thrust requirement. Aeroplane engines which are operated with high combustion temperatures in the combustion chamber therefore call for particularly high maintenance costs.

To reduce the nitrogen oxide emissions and to lower the thermal load, aeroplane engines should therefore be operated with the lowest possible combustion temperatures in the combustion chamber. A reduction in the combustion temperature in the combustion chamber of an aeroplane engine can be realised for example by injecting water during the combustion process. The water can either be supplied to the compressor or injected into the combustion chamber of the engine, for which the water normally has to be carried on board the aeroplane in separate tanks.

The object on which the present invention is based is to provide a system and a process which particularly efficiently enable a reduction in the combustion temperature in the combustion chamber of a engine and therefore a significant reduction in the harmful emissions during operation of the engine.

SUMMARY OF THE INVENTION

To achieve this object, a system according to the invention for reducing harmful substances in engine exhaust gases comprises a fuel cell which is adapted to generate electrical energy and a steam-containing fuel cell exhaust gas during operation. The fuel cell can be adapted, for example, to generate electrical energy on board an aeroplane for an on-board power supply. The fuel cell used in the system according to the invention for reducing harmful substances in engine exhaust gases comprises a cathode region and an anode region which is separated from the cathode region by an electrolyte. During operation of the fuel cell, a fuel, for example hydrogen, is supplied to the anode side of the fuel cell and an oxygen-containing oxidising agent, for example air, in particular air drawn away from an aeroplane cabin, is supplied to the cathode side of the fuel cell. In the case of a polymer electrolyte membrane (PEM) fuel cell, the hydrogen molecules react at an anode catalyst present in the anode region, for example according to equation (1)

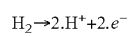
$$H_2 \rightarrow 2.H^+ + 2.e^-$$

and during this lose electrons to the electrode to form positively charged hydrogen ions.

The $H^+$ ions formed in the anode region then diffuse through the electrolyte to the cathode, where they react at a cathode catalyst present in the cathode region with the oxygen which is supplied to the cathode and the electrons which are conducted to the cathode via an external electric circuit according to equation (2)

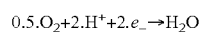
$$0.5.O_2 + 2.H^+ + 2.e_- \rightarrow H_2O$$

to form water. The operating temperature of the fuel cell depends on the type of electrolyte used in the fuel cell. However, the water generated by the fuel cell during operation is normally at least partially present in the gaseous state of aggregation, i.e. the fuel cell generates a steam-saturated fuel cell exhaust gas during operation.

The system according to the invention for reducing harmful substances in engine exhaust gases preferably furthermore comprises a fuel tank for storing fuel which is to be supplied to an engine, in particular an aeroplane engine, during operation. A homogeneous hydrocarbon or a hydrocarbon mixture, e.g. kerosene, is preferably used as the fuel. The fuel tank is preferably adapted to also store fuel at low temperatures, such as those which are normally present in flight mode of an aeroplane.

A condensing device of the system according to the invention for reducing harmful substances in engine exhaust gases is connected to an exhaust gas outlet of the fuel cell. Steam-containing fuel cell exhaust gas which is generated by the fuel cell during operation may therefore be supplied to the condensing device. The condensing device is adapted to convert the steam contained in the fuel cell exhaust gas into the liquid state of aggregation by means of condensation. Furthermore, the condensing is device is adapted to introduce the water obtained as a result of this condensing process into the fuel to form a water/fuel mixture.

Finally, the system according to the invention for reducing harmful substances in engine exhaust gases comprises a water/fuel mixture line which is connected to the engine. A water/fuel mixture can be supplied to the engine via the water/fuel mixture line. During the combustion of the water/fuel mixture, the temperatures which occur in a combustion chamber of the engine are lower than those which occur during the combustion of pure fuel. As a result of lowering the combustion temperature in the combustion chamber of the engine, for example during the start phase of an aeroplane, the harmful emissions, in particular the nitrogen-oxide emissions, can be significantly reduced during operation of the engine. Moreover, the thermal stress on the engine is reduced, which may possibly lead to an increase in the service life of the engine and to a reduction in the maintenance costs for the engine. Finally, cleaning of the engine compressor is made easier, which has an advantageous effect on the engine performance and therefore possibly also the fuel consumption of the engine.

In comparison with conventional water-injection systems, in the system according to the invention for reducing harmful substances in engine exhaust gases, steam is used to moisturize the fuel which is to be supplied to the engine, which steam is generated by the fuel cell as an electrode reaction product during operation. In the system according to the invention, therefore, it is possible to dispense with the provision of voluminous water tanks for storing all the water for mixing with the fuel. The system according to the invention for reducing harmful substances can, however, comprise an additional water tank so that proper moisturizing of the fuel to be supplied to the engine is also possible in operating phases of the fuel cell in which insufficient steam-containing exhaust gas is generated by the fuel cell. Steam which is generated during operation of the fuel cell and which is not required to moisturize the fuel which is to be supplied to the engine can be condensed for example in a separate condensing device and then fed into the water supply network of the aeroplane.

When using the system according to the invention for reducing harmful substances in engine exhaust gases, special water-injection devices at the engine are no longer necessary. The system according to the invention for reducing harmful substances can be readily combined with any engines without requiring structural modifications is of the engines for this. Finally, it would be possible to prevent cavitation-like effects on the compressor blades, such as those which can occur when water is injected directly into the compressor of the engine.

The condensing device of the system according to the invention for reducing harmful substances in engine exhaust gases can be a condensing device which uses outside air to reduce heat in order to provide the energy necessary for the condensation of the steam contained in the fuel cell exhaust gas. Alternatively, or in addition to this, the condensing device can, however, also be connected to a fuel outlet of the fuel tank so that steam-containing fuel cell exhaust gas and fuel from the fuel tank may be supplied to the condensing device. The condensing device can furthermore be adapted to bring the steam-containing fuel cell exhaust gas into contact with the fuel. Since the fuel stored in the fuel tank has a temperature which corresponds approximately to the environmental temperature, particularly when the aeroplane is in flight mode, the steam contained in the fuel cell exhaust gas can be converted into the liquid state of aggregation by means of condensation when the exhaust gas is in contact with the cold fuel. In the condensing device, the water obtained as a result of this condensing process can therefore be introduced into the fuel supplied to the condensing device from the fuel tank. Finally, the water/fuel mixture line can be connected to an outlet of the condensing device so that the water/fuel mixture formed in the condensing device can be supplied to the engine.

The system according to the invention for reducing harmful substances in engine exhaust gases furthermore preferably comprises a homogenising device for homogenising the water/fuel mixture formed in the condensing device. The homogenising device can be constructed in the form of a separate device connected downstream of the condensing device or it can be integrated in the condensing device. It serves to prevent the water and fuel from separating into layers and to instead generate a homogeneous water/fuel emulsion.

The homogenising device can comprise a device for forming an ultrasound field. The device for forming an ultrasound field can, for example, comprise ultrasound sonotrodes known as so-called $\lambda/4$ or $\lambda/2$ oscillators. Alternatively, or in addition to this, the homogenising device can, however, also comprise a mechanical mixing device for generating a uniform water/fuel emulsion. The homogenising device is preferably adapted to generate a water/fuel emulsion which is stable over a defined is period of time.

The water/fuel mixture which is formed in the condensing device and is possibly homogenised in the homogenising device can be injected into the engine directly via the water/fuel mixture line and with the use of existing peripheral components, e.g. lines, pumps, valves etc. As an alternative to this, however, it is also possible to provide a storage container in the water/fuel mixture line for temporary storage of the water/fuel mixture. As a result of the storage container, it is possible to bridge, for example, stoppages or operating phases of the fuel cell in which the moisture contained in the fuel cell exhaust gas is required for other purposes. Moreover, the storage container then also ensures correct functioning of the system according to the invention for reducing harmful substances if the temperature of the fuel is not low enough to ensure adequate condensation of the steam contained in the fuel cell exhaust gas.

The system according to the invention for reducing harmful substances in engine exhaust gases can furthermore comprise a pre-heating device which can be arranged upstream of the condensing device. The pre-heating device is preferably thermally coupled to the fuel cell or another heat source and is connected to the fuel outlet of the fuel tank in order to heat at least some of the fuel to a desired temperature before it is supplied to the condensing device with the aid of the heat generated by the fuel cell or the other heat source during operation. It may thus be possible to dispense with line insulation. Furthermore, pre-heating the fuel enables a reduction in fuel consumption.

The thermal coupling of the pre-heating device to the fuel cell can be realised by connecting the pre-heating device to the exhaust gas outlet of the fuel cell so that the fuel cell exhaust gases which are at an increased temperature depending on the operating temperature of the fuel cell can be supplied to the pre-heating device, which is constructed for example in the form of a heat exchanger. As an alternative to this, it is however also conceivable to integrate the pre-heating device in a cooling to circuit of the fuel cell and to transfer the waste heat generated by the fuel cell during operation to the pre-heating device by way of a corresponding cooling agent. As a result of pre-heating the fuel supplied to the condensing device, it is also possible to reliably prevent ice forming in the condensing device at very low fuel temperatures of up to $-40°$ C., which can occur when an aeroplane is in flight mode.

The system according to the invention for reducing harmful substances in engine exhaust gases can furthermore comprise a post-heating device which can be arranged downstream of the condensing device. The post-heating device is preferably thermally coupled to the fuel cell or another heat source and is connected to an outlet of the condensing device in order to heat at least some of the water/fuel mixture formed in the condensing device to a desired temperature before it is supplied to the engine with the aid of the heat generated by the fuel cell or the other heat source during operation. When the system for reducing harmful substances comprises a homogenising device, the post-heating device is preferably arranged downstream of the homogenising device. The thermal coupling of the post-heating device with the fuel cell can be realised by a connection between the post-heating device, which is constructed for example in the form of a heat exchanger, and the exhaust gas outlet of the fuel cell, so that warm fuel cell exhaust gas which is generated during operation of the fuel cell can be supplied to the post-heating device. As an alternative to this, the post-heating device can, however, also be integrated in a cooling circuit of the fuel cell so that the heat generated by the fuel cell during operation is conducted to the post-heating device by way of a cooling agent.

In a preferred embodiment of the system according to the invention for reducing harmful substances, the fuel tank is connected to a fuel cell exhaust gas line via which low-oxygen fuel cell exhaust gas may be supplied to the fuel tank. As shown in the reaction equations (1) and (2) above, oxygen is consumed during operation of the fuel cell of the system according to the invention for reducing harmful substances. If air is supplied as an oxidising agent to the fuel cell, for example on its cathode side, this air is depleted by the oxygen consumed during the fuel cell reaction before it leaves the fuel cell as exhaust gas. The low-oxygen exhaust gas generated by the fuel cell is sufficiently inert to prevent the formation of an ignitable gas mixture in the fuel tank. Rendering the fuel tank inert with the aid of the low-oxygen fuel cell exhaust gas thus enables the risk of a tank explosion to be reliably minimised. The fuel tank can be connected directly to the exhaust gas outlet of the fuel cell. As an alternative to this, fuel cell exhaust gas which has already flowed through the condensing device, a pre-heating device or a post-heating device can also be supplied to the fuel tank.

In a process according to the invention for reducing harmful substances in engine exhaust gases, steam-containing fuel cell exhaust gas which is generated during operation of a fuel cell is supplied to a condensing device. In the condensing device, the steam contained in the fuel cell exhaust gas is converted into the liquid state of aggregation by means of condensation. The water obtained as a result of the condensing process is introduced into fuel which is to be supplied to an engine during operation in order to form a water/fuel mixture. The water/fuel mixture is finally supplied to the engine.

Furthermore, the fuel which is to be supplied to the engine during operation is preferably supplied to the condensing device. In the condensing device, the steam-containing fuel cell exhaust gas can be brought into contact with the fuel. As the steam-containing fuel cell exhaust gas is brought into contact with the fuel, which has a comparatively low temperature, the steam contained in the fuel cell exhaust gas can be converted into the liquid state of aggregation by means of condensation and the water obtained as a result of the condensing process can be introduced into the fuel. The water/fuel mixture formed in the condensing device can finally be supplied to the engine.

The water/fuel mixture formed in the condensing device is preferably homogenised to prevent separation and to form a uniform water/fuel emulsion in a homogenising device which can comprise a device for forming an ultrasound field and/or a mechanical mixing device.

The water/fuel mixture formed in the condensing device can be injected directly into the engine. As an alternative to this, the water/fuel mixture which is formed in the condensing device and possibly homogenised in the homogenising device can, however, also be temporarily stored in a storage container. Recirculation enables a homogenising device to be of a smaller design.

Before being supplied to the condensing device, at least some of the fuel can be heated to a desired temperature in a pre-heating device, which is arranged upstream of the condensing device and is thermally coupled to the fuel cell or another heat source and is connected to the fuel outlet of the fuel tank, with the aid of the heat generated by the fuel cell or the other heat source during operation.

Furthermore, before being supplied to the engine, at least some of the water/fuel mixture formed in the condensing device can be heated to a desired temperature in a post-heating device, which is arranged downstream of the condensing device, is thermally coupled to the fuel cell or another heat source and is connected to an outlet of the condensing device, with the aid of the heat generated by the fuel cell or the other heat source during operation.

Low-oxygen fuel cell exhaust gas can be supplied to the fuel tank via a fuel cell exhaust gas line for the purpose of rendering it inert.

A water/fuel mixture which is formed exclusively in the condensing device can essentially be supplied to the engine. As an alternative to this, it is, however, also possible to supply only pure fuel or a mixture of pure fuel and a water/fuel mixture to the engine. In a preferred embodiment of the process according to the invention for reducing harmful substances in engine exhaust gases, the water/fuel mixture formed in the condensing device is only supplied to the engine in particular operating phases of the engine.

The water/fuel mixture formed in the condensing device is preferably supplied to the engine during the start and ascent phase of an aircraft driven by the engine. As a result, the particularly high temperatures occurring in the combustion chamber of the engine during this phase can be effectively reduced. In operating phases of the engine in which sufficiently low combustion temperatures are anyway present in the combustion chamber, it is on the other hand possible to dispense with the supply of a water/fuel mixture.

The system according to the invention for reducing harmful substances in engine exhaust gases may be particularly advantageously used in an aircraft, in particular an aeroplane.

BRIEF DESCRIPTION OF THE DRAWINGS

Two preferred exemplary embodiments of a system according to the invention for reducing harmful substances in engine exhaust gases are now explained in more detail with reference to the accompanying schematic drawings, of which

DETAILED DESCRIPTION

Figure 1:
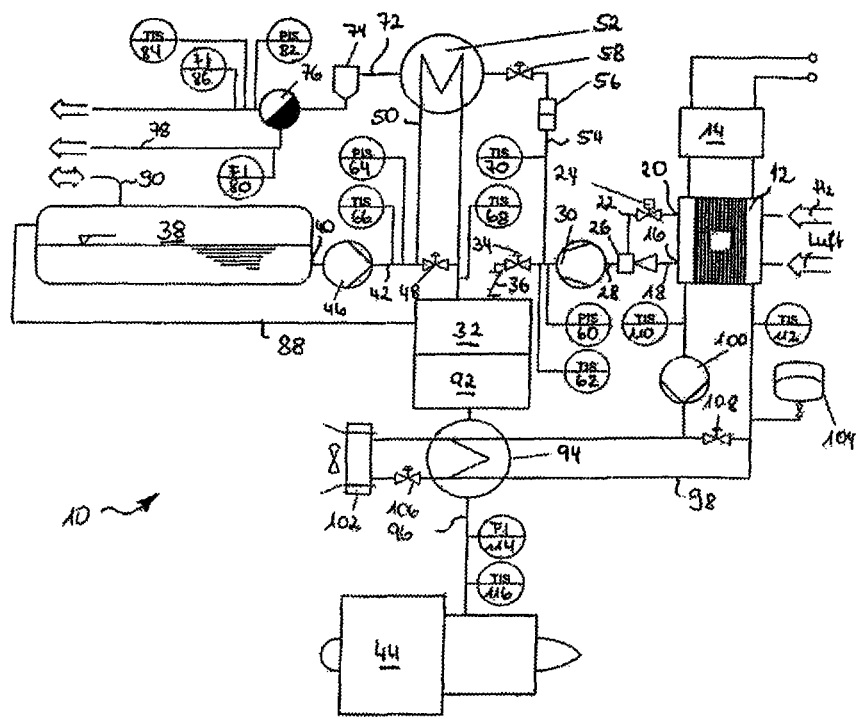
FIG. 1 shows a first embodiment of a system for reducing harmful substances in engine exhaust gases.

FIG. 1 shows a system 10 for reducing harmful substances in engine exhaust gases, which is provided for use in an aeroplane. The system 10 comprises a fuel cell 12, which has a cathode region and an anode region which is separated from the cathode region by an electrolyte. During operation of the fuel cell 12, hydrogen is supplied to the anode region and air from a passenger cabin of the aeroplane is supplied to the cathode region as an oxygen-containing oxidising agent. By way of a current regulator 14, the fuel cell 12 is connected to a network for tapping the electrical energy which is generated by the fuel cell 12 during operation, for example the on-board power supply of the aeroplane.

The exhaust gas is conveyed away from the fuel cell 12 via a cathode exhaust gas line 18, which is connected to a cathode exhaust gas outlet 16, and an anode exhaust gas line 22, which is connected to an anode exhaust gas outlet 20. Arranged in the anode exhaust gas line 22, there is a flush valve 24 which enables the anode region of the fuel cell 12 to be flushed. Thus, nitrogen from the air supplied to the cathode region of the fuel cell 12, which can diffuse from the cathode side to the anode side during operation of the fuel cell 12, can be removed from the anode region of the fuel cell 12. To prevent hydrogen reaching the vicinity of the fuel cell 12, the anode exhaust gas line 24 is connected to the cathode exhaust gas line 18 by way of a Venturi nozzle 26, so that the suction effect of the cathode exhaust gas flowing through the cathode exhaust gas line 18 draws flush gases from the anode exhaust gas line 22 into the cathode exhaust gas flow. To convey the gas flow through the cathode of the fuel cell 12, a suction compressor 30 is arranged downstream of the Venturi nozzle 26 in a fuel cell exhaust gas line 28. However, other ways of conveying fluid through the fuel cell 12 are also conceivable.

The fuel cell exhaust gas line 28 leads into a condensing device 32. The fuel cell exhaust gas flow through the fuel cell exhaust gas line 28 in the direction of the condensing device 32 is controlled by a control valve 34 arranged in the fuel cell exhaust gas line 28 and also a non-return valve 36 arranged downstream of the control valve 34.

A fuel tank 38 has a fuel outlet 40 which is connected to the condensing device 32 via a fuel line 42. The fuel tank 38 serves to store fuel, for example kerosene, which is to be supplied to an engine 44 during operation. To control the flow of fuel through the fuel line 42, a fuel pump 46 and a control valve 48 are arranged in the is fuel line 42.

Fuel from the fuel tank 38 can be supplied directly to the condensing device 32 by way of the fuel line 42. However, at least some of the fuel from the fuel tank 38 can also be conducted through a pre-heating device 52, constructed in the form of a heat exchanger, via a fuel pre-heating line 50. To supply the pre-heating device 52 with thermal energy, the pre-heating device 52 is connected to the fuel cell exhaust gas line 28 via a pre-heating exhaust gas line 54. Via the pre-heating exhaust gas line 54, in which an active carbon filter 56 and a control valve 58 are arranged, warm exhaust gas generated by the fuel cell 12 during operation is supplied to the pre-heating device 52.

During operation of the fuel cell 12, water is generated in the cathode region of the fuel cell as a result of the electrode reaction. Therefore an exhaust gas flow which is saturated with steam flows from the cathode exhaust gas outlet 16 of the fuel cell 12. The temperature of the fuel cell exhaust gas flow depends on the operating temperature of the fuel cell 12. A conventional polymer electrolyte membrane low-temperature fuel cell is conventionally operated at an operating temperature of ca. 60 to 80° C. On the other hand, polymer electrolyte membrane high-temperature fuel cells reach operating temperatures of up to 180° C. In each case, the temperature of the fuel cell exhaust gas flow, in particular in flight mode of the aeroplane, is significantly higher than the temperature of the kerosene received in the fuel tank 38, which corresponds approximately to the environmental temperature.

The pressure and the temperature in the fuel cell exhaust gas line 28 are recorded by means of a pressure sensor 60 and a temperature sensor 62. A pressure sensor 64 is provided to measure pressure in the fuel line 42. Finally, two temperature sensors 66, 68 are provided to record the temperature in the fuel line 42. Finally, a temperature sensor 70 is provided to measure the temperature in the pre-heating exhaust gas line 54.

After flowing through the pre-heating device 52, the fuel cell exhaust gas is conducted through an exhaust gas removal line 72. A condensate separator 74 and a condensate diverter 76 are arranged in the exhaust gas removal line 72 for the purpose of condensing and separating steam contained in the fuel cell exhaust gas. The water obtained during the condensing process is supplied to the water supply network of the aeroplane by way of a water removal line 78. A flowmeter 80 is arranged in the water removal line 78 serves to record the flow through the water removal line 78. The pressure, the temperature and the flow in the exhaust gas removal line 72 are, on the other hand, measured by means of a pressure sensor 82, a temperature sensor 84 and a flowmeter 86.

The fuel cell exhaust gas exiting the exhaust gas removal line 72 can be removed to the environmental atmosphere. As an alternative to this, the low-oxygen fuel cell exhaust gas can, however, also be advantageously used to render the fuel tank 38 inert. To this end, a condenser exhaust air line 88 is connected to the fuel tank 38. The condenser exhaust air line 88 conducts low-oxygen and low-water fuel cell exhaust air into the fuel tank 38, where the fuel cell exhaust air serves to render the fuel tank 38 inert and therefore reduce the risk of it exploding. The fuel tank 38 is ventilated by way of a ventilating line 90.

In the condensing device 32, the steam-containing fuel cell exhaust gas is brought into contact with the fuel from the fuel tank 38, i.e. introduced to the fuel from the fuel tank 38. Owing to the low temperature of the fuel, the steam contained in the fuel cell exhaust gas is converted into the liquid state of aggregation upon contact with the fuel from the fuel tank 38. A water/fuel mixture is therefore formed in the condensing device 32. Before being introduced into the condensing device 32, the fuel from the fuel tank 38 is always heated with the aid of the pre-heating device 52 until the formation of ice during the condensing process is reliably prevented.

To prevent water and kerosene from separating into layers in the condensing device 32, a homogenising device 92 is provided to homogenise the water/fuel mixture formed in the condensing device 32. The homogenising device 92 comprises ultrasound sonotrodes known as so-called $\lambda/4$ or $\lambda/2$ oscillators, which enable an ultrasound field to be generated. Acting on the water/fuel mixture with ultrasound ensures the formation of a homogeneous water/fuel emulsion which is also stable over a defined period of time. The homogeneity is improved by recirculation.

Before it is injected into the engine 44, the water/fuel emulsion is conducted through a post-heating device 94 which is arranged in a water/fuel mixture line 96 which connects the condensing device 32 and the homogenising device 92 to the engine 44. The post-heating device 94 is integrated in a cooling circuit 98 of the fuel cell 12 in which a cooling-agent pump 100, a cooler 102, an equalising vessel 104 and two control valves 106, 108 are furthermore provided. The temperature of the cooling agent flowing through the cooling circuit 98 is monitored by means of two temperature sensors 110, 112. If desired, the water/fuel emulsion can be conveyed passively, i.e. driven by gravity, through the water/fuel mixture line 96.

After it has flowed through the post-heating device 94, the water/fuel mixture is injected into the engine 44. A flowmeter 114 and a temperature sensor 116 record the flow and the temperature in the water/fuel mixture line 96. As a result of injecting a water/fuel mixture into the engine 44, the combustion temperature in a combustion chamber of the engine 44 can be lowered significantly in comparison with the combustion of pure fuel. This enables a considerable reduction in the nitrogen oxide emissions of the engine during operation. Moreover, the thermal load on the engine 44 during operation is advantageously reduced.

It is essentially possible to always supply a water/fuel emulsion to the engine 44. However, it is also possible to supply the engine 44 with a water/fuel emulsion only during certain operating phases, for example during the start and ascent phase of the aeroplane, and with pure fuel during the other operating phases. To this end, the fuel tank 38 can be connected directly to the engine 44 by means of a further fuel line (not shown in FIG. 1), i.e. while by-passing the condensing device 32 and the homogenising device 92.

Figure 2:
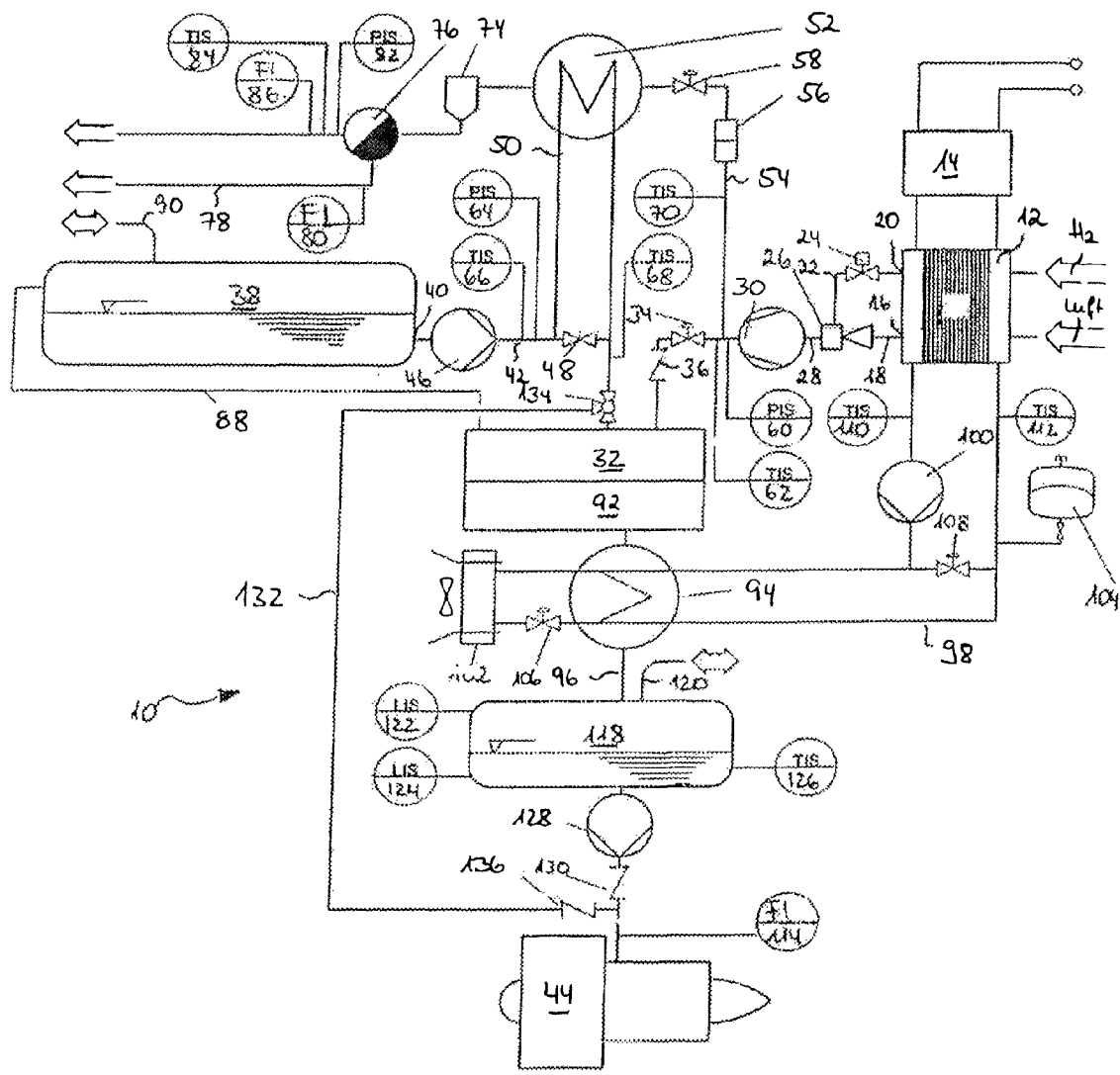
FIG. 2 shows a second embodiment of a system for reducing harmful substances in engine exhaust gases.

The system 10 (shown in FIG. 2) for reducing harmful substances in engine exhaust gases differs from the arrangement shown in FIG. 1 in that an additional emulsion buffer tank 118 for temporary storage of the water/fuel emulsion generated by the condensing device 32 and the homogenising device 92 is arranged in the water/fuel mixture line 96. The ventilation of the emulsion buffer tank 118 is effected via a ventilating line 120. Fill-level sensors 122, 124 monitor the fill level of the emulsion buffer tank 118 whilst a temperature sensor 126 measures the temperature of the water/fuel emulsion in the emulsion buffer tank 118. To convey the water/fuel emulsion from the emulsion buffer tank 118, an emulsion pump 128 is arranged downstream of the emulsion buffer tank 118 in the water/fuel mixture line 96. A non-return valve 130 is provided downstream of the emulsion pump 128 in the water/fuel mixture line 96.

Moreover, the system 10 (shown in FIG. 2) for reducing harmful substances in engine exhaust gases comprises a further fuel line 132 which branches off from the fuel line 42 by way of a reversing valve 134. The further fuel line 132 leads downstream of the emulsion buffer tank 118, the emulsion pump 128 and the non-return valve 130 into the water/fuel mixture line 96. A non-return valve 136 prevents the water/fuel emulsion from the water/fuel mixture line 96 penetrating into the further fuel line 132.

In the system 10 (shown in FIG. 2) for reducing harmful substances, either a water/fuel emulsion or pure fuel can be optionally injected from the fuel tank 38 into the engine 44 by actuating the reversing valve 134. For example, a water/fuel mixture can be supplied to the engine 44 in the start and ascent phase of the aeroplane to reduce the combustion temperature in the combustion chamber of the engine 44. However, as soon as the aeroplane is at cruising altitude, pure fuel can be injected from the fuel tank 38 into the engine 44 which is now no longer operated under full load. The water contained in the fuel cell exhaust gas can then be fed exclusively into the water supply network of the aeroplane. Otherwise the construction and the mode of operation of the system 10 according to FIG. 2 correspond to the construction and the mode of operation of the arrangement shown in FIG. 1.

The invention claimed is:

1. A system for reducing harmful substances in engine exhaust gases comprising:
   a fuel cell which is adapted to generate electrical energy and a steam-containing fuel cell exhaust gas during operation,
   a fuel tank for storing fuel which is to be supplied to an engine during operation,
   a condensing device which is connected to an exhaust gas outlet of the fuel cell so that steam-containing fuel cell exhaust gas is supplyable to the condensing device, and which is adapted to convert the steam contained in the fuel cell exhaust gas into the liquid state of aggregation by condensation and to introduce the water obtained as a result of the condensing process into the fuel in order to form a water/fuel mixture, and
   a water/fuel mixture line which is connected to the engine so that water/fuel mixture is supplyable to the engine,
   wherein the condensing device is further connected to a fuel outlet of the fuel tank so that steam-containing fuel cell exhaust gas and fuel is supplyable to the condensing device, wherein the condensing device is adapted to bring the steam-containing fuel cell exhaust gas into contact with the fuel in order to convert the steam contained in the fuel cell exhaust gas into the liquid state of aggregation by condensation, and wherein the water/fuel mixture line is connected to an outlet of the condensing device so that the water/fuel mixture formed in the condensing device is supplyable to the engine.

2. The system according to claim 1, further comprising:
   a homogenizing device for homogenizing the water/fuel mixture and/or a storage container for temporary storage of the water/fuel mixture, wherein the homogenising device in particular comprises a device for forming an ultrasound field and/or a mechanical mixing device.

3. The system according to claim 1, further comprising:
   a pre-heating device which is thermally coupled to the fuel cell or another heat source and is connected to the fuel outlet of the fuel tank in order to heat at least some of the fuel to a desired temperature before the fuel is supplied to the condensing device with the aid of the heat generated by the fuel cell or the other heat source during operation.

4. The system according to claim 1, further comprising:
   a post-heating device which is arranged downstream of the condensing device and is thermally coupled to the fuel cell or another heat source and is connected to an outlet of the condensing device in order to heat at least some of the water/fuel mixture formed in the condensing device to a desired temperature before the water/fuel mixture is supplied to the engine with the aid of the heat generated by the fuel cell or the other heat source during operation.

5. The system according to claim 1, wherein the fuel tank is connected to a fuel cell exhaust gas line via which low-oxygen fuel cell exhaust gas is supplyable to the fuel tank for the purpose of rendering the fuel tank inert.

6. A method for reducing harmful substances in engine exhaust gases, the method comprising:
   supplying steam-containing fuel cell exhaust gas generated during operation of a fuel cell to a condensing device,
   converting the steam contained in the fuel cell exhaust gas into the liquid state of aggregation in the condensing device by condensation,
   introducing the water obtained as a result of the condensing process into fuel which is to be supplied to an engine during operation in order to form a water/fuel mixture, and
   supplying the water/fuel mixture to the engine,
   wherein the fuel to be supplied to the engine during operation is supplied to the condensing device, wherein the steam-containing fuel cell exhaust gas is brought into contact with the fuel in the condensing device in order to convert the steam contained in the fuel cell exhaust gas into the liquid state of aggregation by condensation, and wherein the water/fuel mixture formed in the condensing device as a result of the condensing process is supplied to the engine.

7. The method according to claim 6, wherein the water/fuel mixture is formed in the condensing device and is homogenized in a homogenizing device, in particular by a device for forming an ultrasound field and/or a mechanical mixing device, and/or wherein the water/fuel mixture formed in the condensing device is temporarily stored in a storage container.

8. The method according to claim 6, wherein, before being supplied to the condensing device, at least some of the fuel is heated to a desired temperature in a pre-heating device, which is thermally coupled to the fuel cell or another heat source and is connected to the fuel outlet of the fuel tank, with the aid of the heat generated by the fuel cell or the other heat source during operation.

9. The method according to claim 6, wherein, before being supplied to the engine, at least some of the water/fuel mixture formed in the condensing device is heated to a desired temperature in a post-heating device which is arranged downstream of the condensing device and is thermally coupled to the fuel cell or another heat source and is connected to an outlet of the condensing device, with the aid of the heat generated by the fuel cell or the other heat source during operation.

10. The method according to claim 6, wherein low-oxygen fuel cell exhaust gas is supplied to the fuel tank via a fuel cell exhaust gas line for the purpose of rendering the fuel tank inert.

11. The method according to claim 6, wherein the water/fuel mixture formed in the condensing device is supplied to the engine only in particular operating phases.

12. The method according to claim 11, wherein the water/fuel mixture formed in the condensing device is supplied to the engine during the start and ascent phase of an aircraft driven by the engine.

\* \* \* \* \*